Patented Jan. 13, 1942

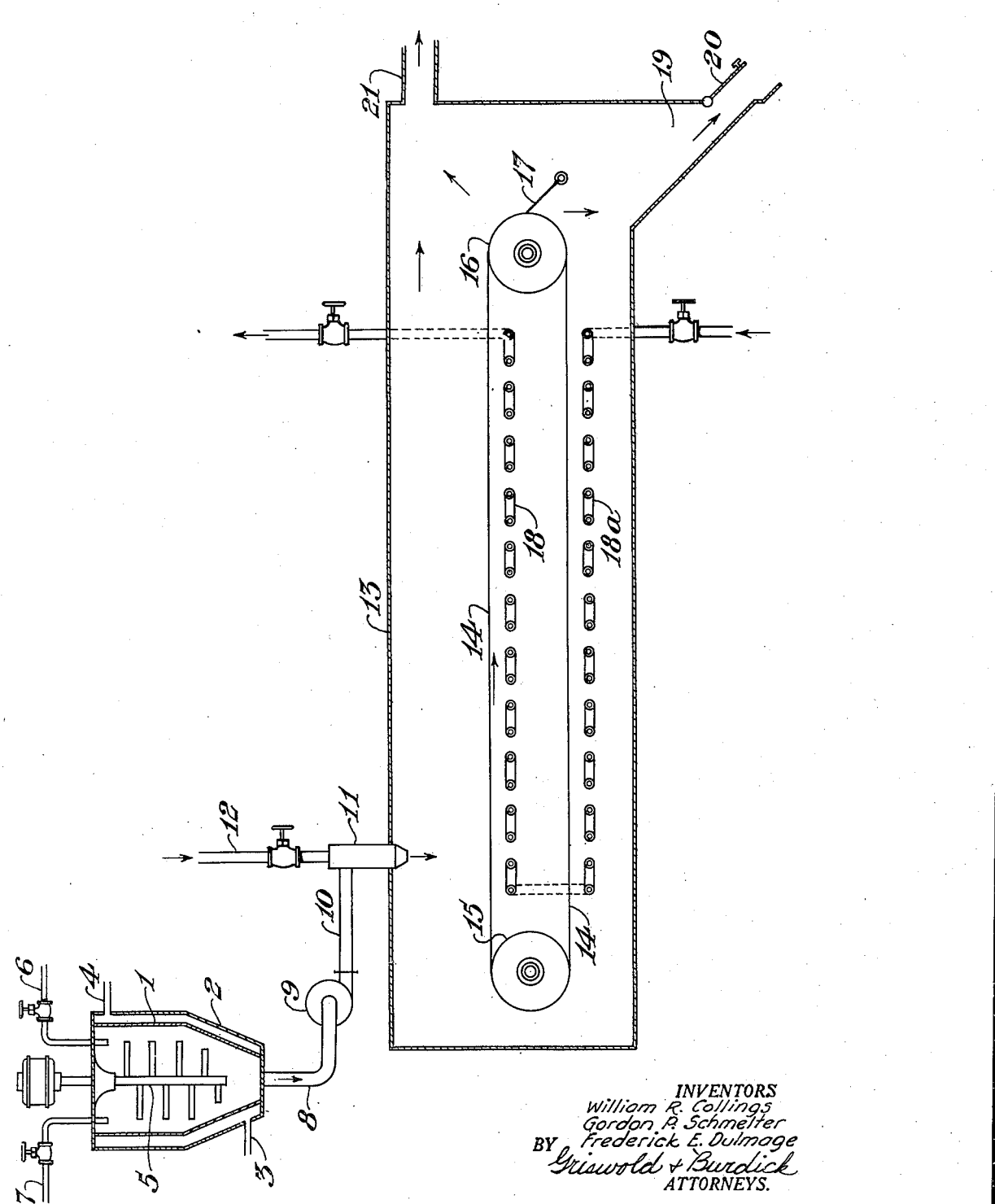

UNITED STATES PATENT OFFICE 2,270,182

MANUFACTURE OF PURIFIED VINYL AROMATIC RESINS IN POWDERED FORM

William R. Collings, Gordon P. Schmelter, and Frederick E. Dulmage, Midland, Mich., assignors to The Dow Chemical Company, Midland, Mich., a corporation of Michigan Application May 19, 1939, Serial No. 274,654

7 Claims. (Cl. 260—36)

This invention concerns a method for manufacturing resinous polymers of vinyl aromatic compounds, particularly styrene, in a powdered form substantially free of volatile impurities.

It is known that styrene does not polymerize completely under usual polymerizing conditions and that the unreacted styrene and any other volatile impurities should be removed in order to obtain a stable product of uniform quality. Heretofore, the volatile impurities have been removed from the polymer by distillation with steam or under vacuum and, alternatively, by dissolving the impure polymer in solvent and precipitating it by addition of alcohol. The first of these methods, e. g. distillation, leaves the product as a fused mass which must subsequently be ground for use in molding operations. The second method, i. e. that involving precipitation of the polymer, usually produces the latter in a thread-like, or cob-web, form which is inconvenient to handle and must be converted to a granular or powdered form for use in molding operations. The grinding of other working required to convert the polymer, purified in either of the known ways just mentioned, to a powder is troublesome and is liable to result in contamination and discoloring of the product. An object of the present invention is to provide a relatively simple and inexpensive method for manufacturing polystyrene and other resinous polymers of vinyl aromatic compounds in a powdered form substantially free of volatile impurities.

We have found that a solution of such polymer in a volatile solvent may be atomized with steam to drive off the solvent and volatile impurities and that in this operation the polymer forms porous particles which harden during falling so that the purified product is collected directly in a powdered form suitable for use as a molding powder.

The annexed drawing is a diagrammatic sketch of apparatus suitable for use in practicing the invention. In the drawing, the numeral 1 designates a polymerizing chamber which is provided with a jacket 2, through which a heating or cooling fluid may be circulated via fluid inlet 3 and outlet 4. The polymerizer is provided with a mechanical stirrer 5, and near its top with an inlet 6 for styrene and an inlet 7 for solvent. A conduit 8 leads from the bottom of the polymerizer 1 to a pump 9 which is connected by conduit 10 with an atomizer 11. The latter is also provided with a steam inlet 12. The atomizer is connected with and directed inside of a spray chamber 13 toward one face of a metal belt 14 within the chamber. The distance between the atomizer and the belt is usually from 1.5 to 4 feet, but it may be greater or less if desired. Belt 14 passes over and is supported by the belt pulleys 15 and 16. The belt is actuated by a usual driving means, not shown. In contact with the outer face of the belt at a point remote from that at which the atomizer is directed is a blade or bar 17 for removing the product from the belt. The product collects in a hopper 19 of the chamber and may be removed therefrom by opening the gate 20 which serves as an outlet for the product. The spray chamber 13 is preferably provided with heating coils or radiators 18 and 18a, but these may be omitted if desired. Steam and vaporized solvent are withdrawn from the spray chamber 13 through vapor outlet 21 which connects with a fan and with solvent recovery means, e. g. condensers, etc., not shown. It will ! understood that the apparatus illustrated by the drawing may be changed in form without departing from the principle of the invention. For instance, instead of employing a single polymerizer to supply the polymer solution, as indicated in the drawing, a number of such polymerizers may be, and usually is, employed. Also, instead of a metal belt, a rotating drum or other suitable conveyor may be used in the spray chamber to collect the purified powdery polymer.

In practicing the invention with apparatus such as that illustrated in the drawing, styrene is charged into polymerizer 1, where it is heated with stirring until it becomes a viscous liquid at the polymerization temperature. If desired, the polymerization may be continued nearly to completion, in which case a volatile solvent such as benzene, toluene, or ethylene chloride, etc., is added gradually in amount sufficient to maintain the mixture in liquid condition. When the styrene is polymerized in the absence of solvents, the polymerization is carried only to the point at which the material is a viscous liquid at the reaction temperature; usually to a point at which from 15 to 50 per cent of the styrene is polymerized. As is well known, the molecular weight and toughness of the polymer are dependent to a considerable extent upon the temperature at which the polymerization is carried out and this temperature is controlled by stirring the mixture while passing a heat transfer fluid, e. g. hot water, steam, or heated oil, through jacket 2 of the polymerizer. Usually, the polymerization is carried out at temperatures between 70° and 170° C., but it may be carried out at lower or higher temperatures if desired.

The polystyrene solution produced as just described is passed to the atomizer 11, where it is mixed and atomized with steam heated sufficiently to vaporize unreacted styrene and any solvent present, thereby producing purified polystyrene in powdered form. The steam is usually fed into the atomizer at temperatures between 100° and 250° C. but it may be used at somewhat higher temperatures if desired. The proportion of steam required is, of course, dependent upon the kind and quantity of solvents accompanying the polymer. In carrying out the atomization, the material preferably leaves the atomizer with a swirling motion which aids in keeping the nozzle opening clean and prevents plugging. The vapor mixture of steam and solvent produced by the atomization also aids in keeping the nozzle clean, i. e. free of occluded polymer, provided the belt surface on which the powdered polymer is collected is between about 1.5 and 4 feet from the nozzle. Apparently, the belt, when at such distance from the spray nozzle, causes the vapors to circulate over and clean the outer surface of the nozzle. It is important that the vapor mixture of steam and solvent be withdrawn from the spray chamber without appreciable condensation (particularly of the organic solvent vapors) occurring, since otherwise the solvent may condense on the powdered product and contaminate it. Condensation is prevented by withdrawing the vapors as rapidly as possible from the chamber while maintaining the latter at temperatures of 80° C. or above. The zone of the chamber through which the polystyrene-laden conveyor belt travels is preferably at temperatures between 80° and 120° C.

As hereinbefore stated, the mixture of steam and solvent vapors withdrawn from the spray chamber are treated, e. g. condensed, and the organic layer of condensate separated, for recovery of the solvent. The latter may be returned to the polymerizer for re-employment in the process.

The pulverulent polystyrene produced as just described is substantially pure and is adapted to employment as a molding powder. However, for molding purposes the presence of plasticizers and/or coloring agents is often desired. When such product is desired, a plasticizing agent or a coloring agent, e. g. a dye or pigment, which is substantially non-volatile under the atomizing conditions is added to the polystyrene solution, after which the latter is atomized with steam, as hereinbefore described. In preparing such plasticized product, the plasticizing agent is, of course, used in a limited proportion, e. g. usually less than 20 per cent by weight, so as to avoid undue softening of the product.

Resinous polymers of other vinyl aromatic compounds, e. g. para-chloro-styrene, para-methyl-styrene, ortho-chloro-styrene, meta-ethyl-styrene, vinyl-naphthalene, etc., may be produced in a powdered form substantially free of volatile impurities by the foregoing method.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

1. The method which comprises evaporating a volatile organic solvent from a solution of a polymer of a vinyl aromatic compound in such solvent and at the same time producing the resin in a pulverulent form substantially free of volatile impurities by atomizing the solution in admixture with steam heated sufficiently to vaporize the solvent while preventing condensation of the vapors in the presence of the residual polymer.

2. The method which comprises evaporating a volatile organic solvent from a solution of polystyrene in such solvent and at the same time producing the polystyrene in a pulverulent form substantially free of volatile impurities by atomizing the solution in admixture with steam heated sufficiently to vaporize the solvent while preventing condensation of the vapors in the presence of the residual polymer.

3. The method which comprises atomizing a solution of a polymerized vinyl aromatic compound and a non-volatile plasticizer therefor in a volatile organic solvent by admixture with steam heated sufficiently to vaporize the solvent, while preventing condensation of the organic solvent vapors in the presenece of the residual polymer, whereby the polymer is produced in a pulverulent plasticized form substantially free of volatile ingredients.

4. The method which comprises atomizing a solution of polystyrene and a non-volatile plasticizer therefor in a volatile organic solvent admixture with steam heated sufficiently to vaporize the solvent, while preventing condensation of the organic solvent vapors in the presence of the residual polymer, whereby the polymer is produced in a pulverulent plasticized form substantially free of volatile ingredients.

5. The method which comprises atomizing a solution of a polymerized vinyl aromatic compound and a non-volatile coloring agent therefor in a volatile organic solvent by admixture with steam heated sufficiently to vaporize the solvent, while preventing condensation of the organic solvent vapors in the presence of the residual polymer, whereby the polymer is produced in a colored pulverulent form substantially free of volatile ingredients.

6. The method which comprises atomizing a solution of polystyrene and a non-volatile coloring agent therefor in a volatile organic solvent by admixture with steam heated sufficiently to vaporize the solvent, while preventing condensation of the organic solvent vapors in the presence of the residual polymer, whereby the polymer is produced in a colored pulverulent form substantially free of volatile ingredients.

7. The method which comprises evaporating a volatile organic solvent from a solution of a polymer of a vinyl aromatic compound in such solvent and at the same time producing the resin in a pulverulent form substantialy free of volatile impurities by atomizing the solution in admixture with steam heated sufficiently to vaporize the solvent, while preventing condensation of the vapors in the presence of the residual polymer, the mixture of steam and the polymer solution being atomized with a swirling motion at a distance between about 1.5 and about 4 feet from a moving surface and directed toward said surface so that the polymer is collected on the surface, and removing the polymer from the surface

WILLIAM R. COLLINGS.
GORDON P. SCHMELTER.
FREDERICK E. DULMAGE.